(No Model.)
M. D. L. & J. M. HARTLEY.
WHIFFLETREE.
No. 285,032. Patented Sept. 18, 1883.
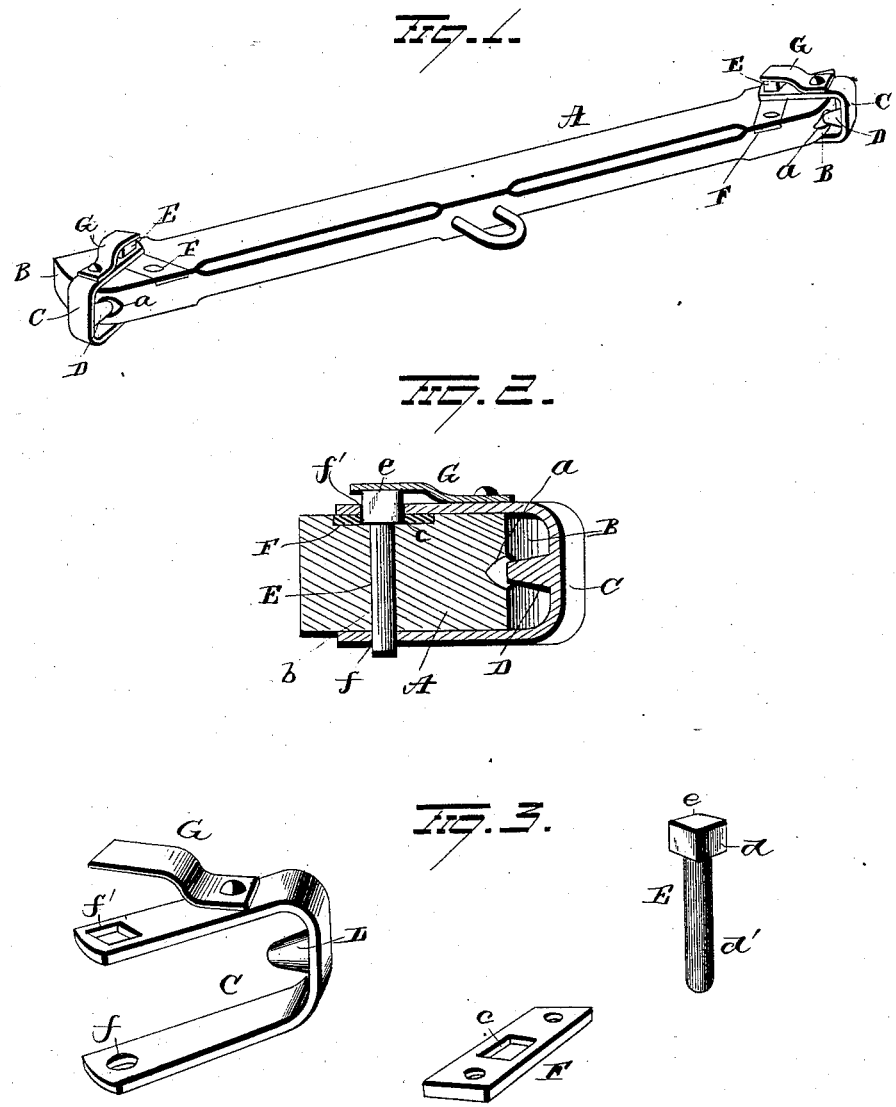

UNITED STATES PATENT OFFICE.

MARQUIS D. L. HARTLEY AND JAMES M. HARTLEY, OF SAN DIEGO, CAL.

WHIFFLETREE.

SPECIFICATION forming part of Letters Patent No. 285,032, dated September 18, 1883.

Application filed July 3, 1883. (No model.)

*To all whom it may concern:*

Be it known that we, MARQUIS D. L. HARTLEY and JAMES M. HARTLEY, of San Diego, in the county of San Diego and State of California, have invented certain new and useful Improvements in Whiffletrees; and we do hereby declare the following to be a full, clear, and exact description of the invention, such as will enable others skilled in the art to which it appertains to make and use the same.

Our invention relates to an improvement in whiffletrees, the object of the same being to provide a cheap, simple, and durable device that will be valuable for general use, but more particularly applicable for agricultural and horticultural purposes; and with these ends in view our invention consists in the parts and combination of parts, as will be more fully described, and pointed out in the claims.

In the accompanying drawings, Figure 1 is a view in perspective of our improved device. Fig. 2 is a transverse sectional view, showing the manner of locking the whiffletree-hook; and Fig. 3 is a detached perspective view of the locking-plate, pin, and hook.

A represents a whiffletree provided with the rearwardly-curved ends B, around which the traces wind. This whiffletree is preferably made of wood, of any desired size, and is provided centrally with means for its attachment to the clevis of a plow or other agricultural implement, or to a vehicle.

C are U-shaped whiffletree-hooks, the opposite ends of which are provided with pin or bolt holes, while the central portions thereof are each provided with inwardly-projecting tongues D, which latter are adapted to register with the recesses $a$, formed in the rear curved faces of the whiffletree. These hooks are adapted to be secured to the opposite ends of the whiffletree A by the pins or bolts E, the construction of which will be described later on.

The bolts E pass through the openings $b$ in the ends of the whiffletree and form the axis on which the hooks turn, the said axis being situated eccentrically to the curved ends B, so that the hooks will be prevented from turning beyond the recesses $a$.

On the upper surface of the whiffletree, and immediately over the openings $b$, are secured the plates F, which latter are provided with angular openings $c$. These openings register with the openings $b$ of the whiffletree, and are adapted to receive the angular necks $d$ of the bolts E and prevent said bolts from turning when the parts are locked in place.

The hooks C, as before stated, are provided with two openings, $f$ and $f'$. The opening $f'$, being angular in shape, snugly embraces the neck of the bolt or pin and corresponds with the angular opening in the plate F, while the opening $f$ is round, to correspond with the shank of the bolt.

The bolts E are each composed of a head, $e$, neck $d$, and shank $d'$, the head being simply for the purpose of preventing the bolts from dropping through the whiffletree.

To secure the hooks to the whiffletree it is simply necessary to place the former in position and drop the bolts in place. The shank of the bolt passes completely through the whiffletree, while the necks $d$ rest in the angular opening in the plates and the angular openings $f'$ of the hook. Thus it will be seen that the hooks are locked and are prevented from moving until the bolt is partly elevated. The bolts are retained in place by the flat springs G, which are secured to the hooks and bear on the heads of the bolts. The lower ends of the bolts E project below the whiffletree, and when it is desired to turn the hooks for the purpose of releasing or securing a trace the said bolts are pushed up slightly, which elevates the neck $d$ thereof above the opening $c$ of the plate. The hook is then free to be turned in either direction. As soon as the upward pressure on the bolt is relieved the spring H forces it down to its normal position.

To secure the traces to the whiffletree, the bolts are first elevated and the traces passed between the opposite ends of the whiffletree and the hooks, and adjusted to suit the animal. The hooks are then turned, and the tongues D thereof enter their respective trace-openings and rest within the recesses $a$. The pressure on the bolts is then relieved, and the angular necks $d$ thereof enter the angular openings in the plates and lock the hooks firmly in position.

By the arrangement of parts the ends of the whiffletrees present no exposed ends which would be liable to damage or injure the crops by engaging therewith, and the danger of the traces becoming accidentally displaced is obviated. It is also apparent that should it become necessary to detach the traces while they are under a strong tension, as in the case of the horse falling, it can be easily and readily accomplished without cutting the trace, as might be necessary with the whiffletree-hooks ordinarily employed.

Our invention is simple in construction, is durable and effective in use, can be manufactured at a small initial cost, and is adapted for use on all vehicles, machines, or implements where ordinary whiffletrees are employed.

It is evident that slight changes in the construction and relative arrangement of the several parts might be resorted to without departing from the spirit of our invention, and hence we would have it understood that we do not confine ourselves to the exact construction shown and described, but consider ourselves at liberty to make such changes and alterations as fairly fall within the spirit and scope of our invention.

Having fully described our invention, what we claim as new, and desire to secure by Letters Patent, is—

1. The combination, with a whiffletree having curved recessed ends, of hooks provided with tongues adapted to enter the recesses.

2. The combination, with a whiffletree having curved recessed ends, of hooks and devices for locking the hooks.

3. The combination, with a whiffletree having curved recessed ends, of hooks and bolts for locking the hooks to the whiffletrees.

4. The combination, with a whiffletree having curved recessed ends, of hooks having tongues formed integral therewith and bolts for locking the hooks against movement.

5. The combination, with a whiffletree having curved recessed ends and plates having angular openings therein, secured to the said whiffletree, of hooks having tongues formed integral therewith and provided with bolt-openings, one of which latter is angular in shape, and bolts having angular necks adapted to register with the angular openings in the hooks and plates, substantially as set forth.

6. The combination, with the whiffletree and perforated plates, of the hooks, bolts, and springs, all of the above parts combined and adapted to operate as described.

In testimony whereof we have signed this specification in the presence of two subscribing witnesses.

MARQUIS D. L. HARTLEY.
JAMES M. HARTLEY.

Witnesses:
H. C. TIBBETS,
J. W. TIBBETTS.